(12) United States Patent
Rubycz et al.

(10) Patent No.: US 10,468,945 B2
(45) Date of Patent: Nov. 5, 2019

(54) METHOD AND SYSTEM FOR ENERGY CONVERSION FROM PRESSURE ENERGY INTO ELECTRICAL ENERGY

(71) Applicant: Atlas Copco Energas GmbH, Cologne (DE)

(72) Inventors: Rasmus Rubycz, Cologne (DE); Eduard Walter, Wuppertal (DE)

(73) Assignee: Atlas Copco Energas GmbH, Cologne (DE)

( * ) Notice: Subject to any disclaimer, the term of this patent is extended or adjusted under 35 U.S.C. 154(b) by 0 days.

(21) Appl. No.: 15/474,026

(22) Filed: Mar. 30, 2017

(65) Prior Publication Data

US 2017/0294822 A1 Oct. 12, 2017

(30) Foreign Application Priority Data

Apr. 12, 2016 (DE) .................. 10 2016 106 733

(51) Int. Cl.
*H02K 7/18* (2006.01)
*F02C 1/00* (2006.01)
*F01K 25/08* (2006.01)

(52) U.S. Cl.
CPC ........... *H02K 7/1823* (2013.01); *F01K 25/08* (2013.01); *F02C 1/007* (2013.01)

(58) Field of Classification Search
CPC ........ F02C 1/007; F01K 25/08; H02K 7/1823
See application file for complete search history.

(56) References Cited

U.S. PATENT DOCUMENTS

| | | | | |
|---|---|---|---|---|
| 4,942,736 A | * | 7/1990 | Bronicki | ............... F02C 1/05 60/641.12 |
| 5,379,589 A | * | 1/1995 | Cohn | .................. F01B 17/00 60/39.59 |
| 5,628,191 A | | 5/1997 | Kueck et al. | |
| 7,832,207 B2 | * | 11/2010 | McBride | ............. F15B 1/024 60/410 |
| 8,225,606 B2 | * | 7/2012 | McBride | ............. F15B 11/032 60/508 |
| 8,249,728 B2 | * | 8/2012 | Kesch | .................. F02P 3/0456 700/21 |

(Continued)

FOREIGN PATENT DOCUMENTS

| | | |
|---|---|---|
| DE | 10155508 | 8/2002 |
| DE | 10 2012 220188 A1 | 5/2014 |
| EP | 0 670 957 | 9/1995 |

OTHER PUBLICATIONS

European Search Report in European Application 17152391.3-1610 dated Jul. 20, 2017 with English translation of the relevant parts.

*Primary Examiner* — Sean Gugger
(74) *Attorney, Agent, or Firm* — Collard & Roe, P.C.

(57) ABSTRACT

A method for energy conversion from pressure energy into electrical energy uses an expansion turbine. In the method, a pressurized, gaseous, first medium is heated before being fed into the expansion turbine. The expansion turbine drives a generator and a compressor. At least one gaseous second medium is compressed by the compressor in a heating arrangement. Heat generated by the compression and preferably also via utilization of ambient heat according to a heat exchanger principle is used for heating the gaseous first medium.

11 Claims, 2 Drawing Sheets

(56) References Cited

U.S. PATENT DOCUMENTS

| | | | | |
|---|---|---|---|---|
| 8,327,641 | B2* | 12/2012 | Freund | F01K 23/10 60/641.8 |
| 8,572,972 | B2* | 11/2013 | Frey | F01K 3/02 60/641.14 |
| 8,656,720 | B1* | 2/2014 | Hardgrave | F01K 7/34 60/641.2 |
| 9,500,185 | B2* | 11/2016 | Al-Sulaiman | F01K 23/02 |
| 9,938,895 | B2* | 4/2018 | Kerth | F02C 6/16 |
| 2011/0283700 | A1* | 11/2011 | Zohar | F03G 6/067 60/641.15 |
| 2014/0182291 | A1* | 7/2014 | Madison | F03G 6/003 60/645 |
| 2015/0145256 | A1* | 5/2015 | Omoruyi | F01D 15/10 290/52 |
| 2015/0275691 | A1* | 10/2015 | Keogh | F02C 3/073 290/52 |

* cited by examiner

METHOD AND SYSTEM FOR ENERGY CONVERSION FROM PRESSURE ENERGY INTO ELECTRICAL ENERGY

CROSS-REFERENCE TO A RELATED APPLICATION

The invention described and claimed hereinbelow also is described in German Patent Application 10 2016 106 733.4, filed on Apr. 12, 2016. The subject matter of the German Patent Application is incorporated herein by reference and, provides the basis for a claim of priority of invention under 35 U.S.C. 119(a)-(d).

BACKGROUND OF THE INVENTION

The present invention relates to a method and system for energy conversion from pressure energy into electrical energy using an expansion turbine, wherein a pressurized, gaseous, first medium is heated before being fed into the expansion turbine and the expansion turbine drives a generator.

Within the scope of a growing increase in efficiency of processing plants or power plants, there is an increasing demand for making use of the high-pressure energy of resultant process gases, to use the process gases to operate generators, for example, for generating electrical energy. For this purpose, the process gas is fed to an expansion turbine or an expander which reduces the pressure in a controlled manner and converts the pressure into mechanical energy in the form of rotational energy. Because of the pressure reduction, the process gas cools down considerably due to the so-called Joule-Thomson effect. Ice crystals can form in this case during the use of process gases having a certain portion of residual moisture, for example, humid air or natural gas, when a limit temperature is fallen below, for example T=0° C. in the case of water. Due to the relatively high flow velocities in an expansion turbine, the ice crystals carried along in the flow can result in considerable damage, and therefore a formation of ice should be ruled out in advance.

A method has proven particularly successful in this case in which the process gas is heated, before being fed into an expansion turbine, in such a way that the expansion ensures that a lower limit temperature, at which ice crystals can form, is not fallen below. The heat source for the heating process is primarily the hot exhaust gas from a combustion system.

For example, DE 101 55 508 A1 describes a method in which pressurized natural gas is heated, before the expansion in an expansion turbine, by means of a branch flow from the water-steam circuit, which was previously heated in a waste heat boiler operated by the hot exhaust gases of a gas turbine.

According to EP 0 670 957 B1, the heat required for the heating process is obtained via a block-type thermal power station consisting of a gas internal combustion engine and a generator for power generation.

The problem associated with the previously utilized methods, however, is that heating the process gases always requires the use of combustion processes. This method is therefore not particularly efficient, either from an ecological perspective or from an economic perspective. Also, it is disadvantageous in this case that additional greenhouse gases are also emitted due to a classical burning of gas.

SUMMARY OF THE INVENTION

The present invention overcomes shortcomings of known arts, such as those mentioned above.

The present invention provides a method and a device for carrying out the method, in which the efficiency and, in particular, the overall degree of effectiveness for making use of the high-pressure energy of resultant process gases, in order to use the process gases to operate generators, for example, for generating electrical energy, is improved.

The invention teaches that the expansion turbine drives a compressor in addition to the generator in a method wherein at least one gaseous second medium is compressed by the compressor in a heating arrangement, and the heat generated by the compression is used for heating the gaseous first medium. The fact that temperature increases during a compression of a medium, in contrast to an expansion turbine, is taken advantage of in this case.

The hot medium can be subsequently fed, for example, directly to an input heat exchanger, whereby energy is transferred to the first medium. The heating arrangement in this case offers the possibility of an open process, for example, using warm ambient air, and the possibility of a closed circuit.

According to the invention, the burning of fossil fuels or any other type of energy supply can be dispensed with, wherein ambient heat is supplied in addition to the pressure energy, preferably according to a heat exchanger principle. The advantage also results that a method according to the invention or an expansion turbine system provided for carrying out the method can be operated autonomously, wherein the medium merely needs to be carried away as compressed gas and after the expansion, and the electrical energy that is obtained is utilized or conducted away.

The first medium, which is expanded to recover energy, can be, for example, natural gas or compressed air. Liquified natural gas (LNG), which is vaporized after having been transported, is often present under high pressures but relatively low temperatures, wherein, within the scope of the invention, the pressure energy or the feeding into a long-distance gas grid or any other type of use is intended to be converted into electrical energy. Within the scope of the invention, however, any other media such as compressed air can be used.

The second medium should allow for an effective heat exchange, wherein the heat capacity should preferably also be utilized during a vaporization or a condensation. Within the scope of the invention, propane, for example, is suitable for use as the second medium.

In an embodiment of the heating arrangement as a closed thermodynamic circuit, it is preferred to use a medium which is initially stored in a liquid state of matter in a tank and is vaporized under the influence of external energy. Thus, the vaporization energy can be used particularly efficiently in the circuit in a particularly advantageous way. The external energy can be provided, for example, via solar thermal, geothermal, or other thermal processes.

In an embodiment, the second medium and the process-related pressures are selected in such a way that the vaporization temperature of the second medium is below the ambient temperature. The ambient temperature is measured and determined in advance for this purpose. Due to the temperature difference between the surroundings and the second medium, heat flows from the surroundings into the second medium, whereby a preferably complete vaporization of the still partially liquid second medium takes place if the heat exchanger arrangement is designed accordingly, and therefore the second medium can be fed to the compressor in a gaseous state of matter, and the heat of vaporization can be utilized for energy. In addition, or as an alternative to a complete vaporization, a slight heating of the gaseous second medium can also take place, depending on the resultant temperature difference.

If the energy is provided by other thermodynamic processes, the selection of the second medium and the pressure ranges must be adapted accordingly when the process is carried out. Propane has proven to be particularly suitable in this context. In principle, the invention includes the possibility of a single-stage or a multiple-stage compression in the compressor. In the case of a two-stage compression, the second medium is returned to the tank after a first compression, whereby the flow can be calmed down and any liquid that may have formed due to the compression can be separated out. The second medium is subsequently fed to a second compression stage in the gaseous state. One variant embodiment also is possible, however, in which the second medium is compressed only in the first compression stage and a further medium is utilized in the second compression stage, wherein a heat exchange initially takes place between the two media before the second compression stage.

In an embodiment, the second medium is not used directly for heating the gaseous first medium in an input heat exchanger, but rather transfers its heat initially in a first heat exchanger to a third medium, wherein the third medium is subsequently used for heating the gaseous first medium in the input heat exchanger. A liquid is preferably used as the third medium, in particular water.

The third medium preferably circulates in a closed circuit. For this purpose, the third medium is initially stored in a tank and is fed, driven via a pump, to the input heat exchanger. The third medium, which has been cooled in this way, is subsequently heated again by the second medium in a first heat exchanger before it is subsequently fed back to the tank. To ensure that a sufficient quantity of the heated third medium is already present upon start-up of the expansion turbine, the third medium can be optionally preheated in the associated tank by means of a separate heating.

The invention also offers the possibility to use, in addition to the heat of compression and ambient heat obtained by heat exchange, further waste heat, for example, from an oil cooler or a generator cooler, for the process of heating the third medium.

In an embodiment, the pressure energy, the ambient heat and, optionally, waste heat generated in the process itself, are exclusively used for the energy conversion from pressure energy into electrical energy. This method can therefore be operated fully autonomously and independently without the need to supply energy from other thermodynamic processes.

Since a liquid, in particular, water, is preferably used as the third medium, the temperature difference between the first medium and the third medium is limited due to the boiling temperature of the liquid. For this reason, the first medium is initially expanded in a first stage to an intermediate pressure level, is subsequently preheated again, and finally, in a second stage, is fully expanded to a final pressure. Thus, the intermediate temperature of the first medium is maintained during the expansion without there being a need for a particularly hot third medium for heating the first medium. In this case, the third medium also is preferably used for the second heating process.

The invention also offers the possibility of a single-stage expansion, in which expansion takes place directly to the final pressure, without an intermediate second heating process.

The invention also provides an expansion turbine system for carrying out the above-described method, wherein the expansion turbine system provides an expansion turbine and a generator, and the expansion turbine drives the generator via a transmission. The expansion turbine is further connected via the transmission to a compressor, which is provided as a component of a heating arrangement for compressing the second medium, and wherein the heating arrangement comprises an input heat exchanger in a supply line of the expansion turbine for heating the first medium.

The invention also comprises a thermodynamic method for energy conversion of pressure energy into electrical energy, wherein a pressurized process gas is initially preheated and is subsequently expanded, wherein the pressure energy is converted into mechanical energy and then into electrical energy. For the method described herein, a portion of the mechanical energy is utilized for operating a thermodynamic cycle. In the cycle, a liquid heating medium is initially vaporized via the supply of external energy and is subsequently compressed in the gaseous state. After the cooling and condensation of the gaseous heating medium via the direct or indirect release of energy to the process gas, the heating medium is throttled, whereby the pressure is reduced again, and therefore the cooling medium can be fed back to the cycle.

In a refinement of the thermodynamic cycle, the heat from the heating medium is not given off directly to the process gas, but rather is used for heating a second thermodynamic cycle. A liquid transfer medium, which circulates due to the provision of mechanical work, is initially provided for this second thermodynamic cycle. The transfer medium cools down due to the release of thermal energy to the process gas and is subsequently reheated via the supply of thermal energy from the heating medium.

It is understood that the features mentioned above and which are described in the following may be used not only in the combination described, but also in other combinations or alone, without departing from the scope of the present disclosure.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
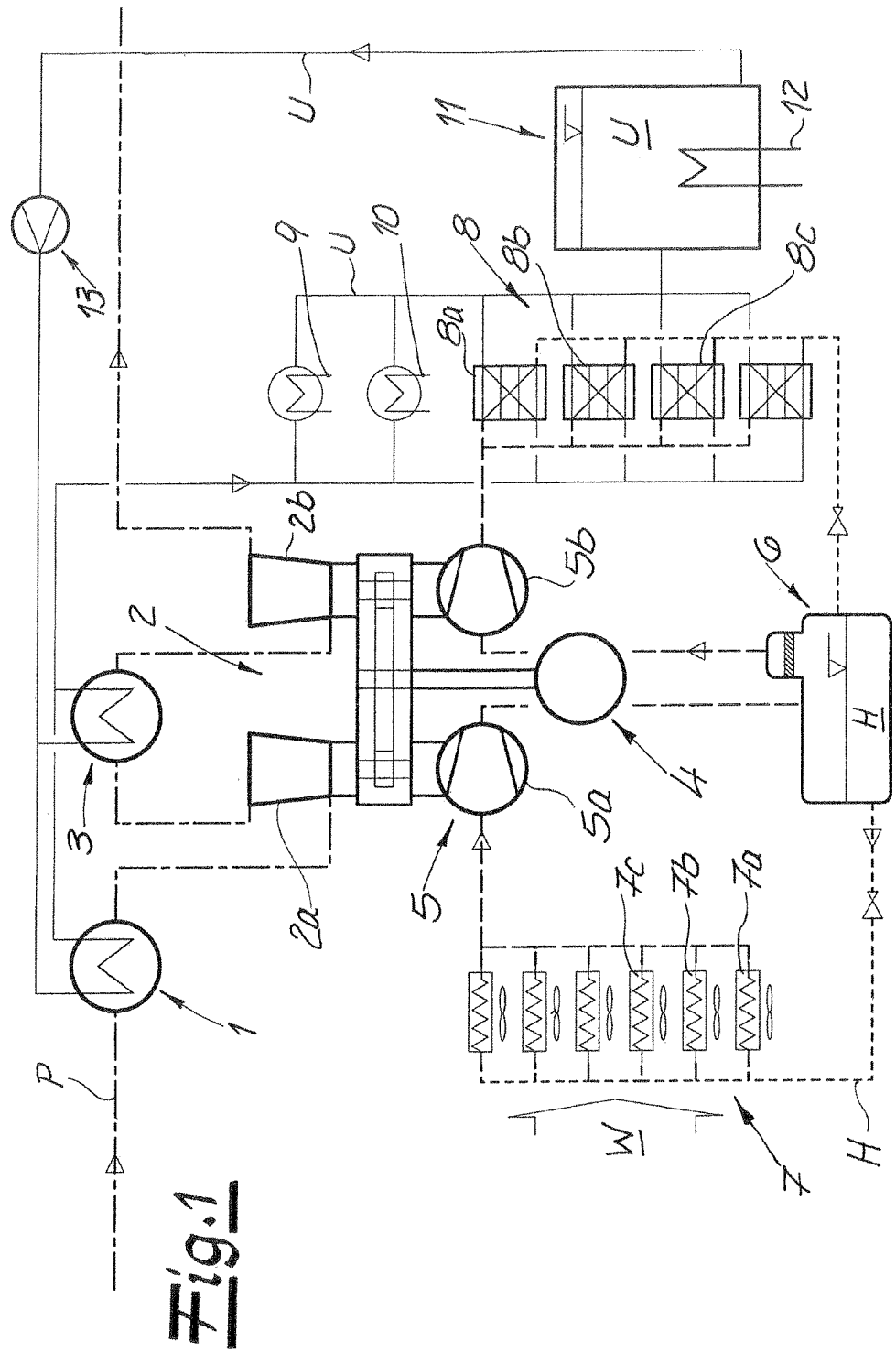
FIG. 1 shows a method according to the invention having a process gas, a heating medium, and a transfer medium.

FIG. 1 schematically shows a process circuit diagram for the method according to the invention for energy conversion from pressure energy into electrical energy.

Therein, a pressurized process gas P, for example, natural gas, is initially heated, as the first medium, in an input heat exchanger 1 and is subsequently expanded in a first stage 2a of an expansion turbine 2 to an intermediate pressure level. The process gas P is subsequently reheated in an intermediate heat exchanger 3. A second expansion of the process gas P then takes place in a second stage 2b of the expansion turbine 2.

The mechanical energy generated by the expansion turbine 2 is used for driving an electric generator 4 via a transmission and a compressor 5 comprising a first stage 5a and a second stage 5b.

A heating medium H is provided, as the second medium, in a heating medium tank 6, wherein the heating medium H is present in the heating medium tank 6 as a two-phase, liquid/gaseous mixture. The heating medium H is withdrawn from the heating medium tank 6 in an at least partially liquid state and is fed to a vaporization arrangement 7. The vaporization arrangement 7 can consist of multiple individual vaporizers 7a, 7b, 7c, . . . , wherein the individual vaporizers 7a, 7b, 7c, . . . are connected in parallel to one another. Any energy source having a higher temperature than the vaporization temperature of the heating medium H is suitable for vaporizing the heating medium H. Propane is preferably used as the heating medium H in the example shown, since propane vaporizes at very low temperatures and can be returned to a liquid state in a simple way via compression and re-cooling. Due to the low boiling temperature of propane, vaporization can take place simply under the influence of ambient heat W. This is advantageous, in particular, when the method described herein is carried out in a system which is set up in an area having particularly high ambient temperatures. Thus, a slight heating of the now gaseous heating medium H can take place in addition to the vaporization.

After the vaporization, the heating medium H is fed to the compressor 5 which is driven by the expansion turbine 2. The compression takes place in two stages in this case. In the first stage 5a, the heating medium H is compressed to an intermediate pressure level and is subsequently fed back to the heating medium tank 6. Due to the different density ratios of liquid and gaseous heating medium H, the liquid portion settles on the bottom of the heating medium tank 6 and the gaseous portion settles in the cover region of the heating medium tank 6.

The state of matter of the heating medium H can therefore be selected depending on which removal point is selected. The heating medium H, which is at an intermediate pressure level, is withdrawn from the heating medium tank 6 again, through an opening in the cover region of the heating medium tank 6, and is fed to a second compression stage 5b of the compressor 5.

The heating medium H, which has been heated because of the pressure increase in the second stage 5b, is subsequently fed to a first heat exchanger 8, and the heat of the heating medium H is transferred to the transfer medium U as the third medium.

The first heat exchanger 8 consists of multiple connected individual heat exchangers 8a, 8b, 8c, . . . for this purpose. In addition, the thermal energy from a generator cooler 9 and the thermal energy from an oil cooler 10 are transferred to the transfer medium U.

The transfer medium U also circulates in a closed circuit and is initially stored in a transfer medium tank 11. Since heated transfer medium U is not yet present during a start-up of the expansion turbine 2 and, therefore, a preheating of the process gas P cannot take place, the transfer medium tank 11 is additionally provided with a separate heating 12, which continues to preheat the preferably liquid transfer medium U to the required temperature until the required heat quantity can be provided by the compressed heating medium H.

Water is used as the transfer medium U for preheating in the example shown, where the water flows in the liquid state, via a pump 13, out of the transfer medium tank 11 and through the input heat exchanger 1 as well as the intermediate heat exchanger 3. The input heat exchanger 1 and the intermediate heat exchanger 3 are connected in parallel to one another in this case.

An arrangement also is conceivable in which the input heat exchanger 1 and the intermediate heat exchanger 3 are connected in series. The transfer medium U cools down because of the heat transfer and is subsequently heated by the heat of compression as well as by the heat from the generator cooler 9 and the oil cooler 10, and is fed back to the transfer medium tank 11.

Figure 2:
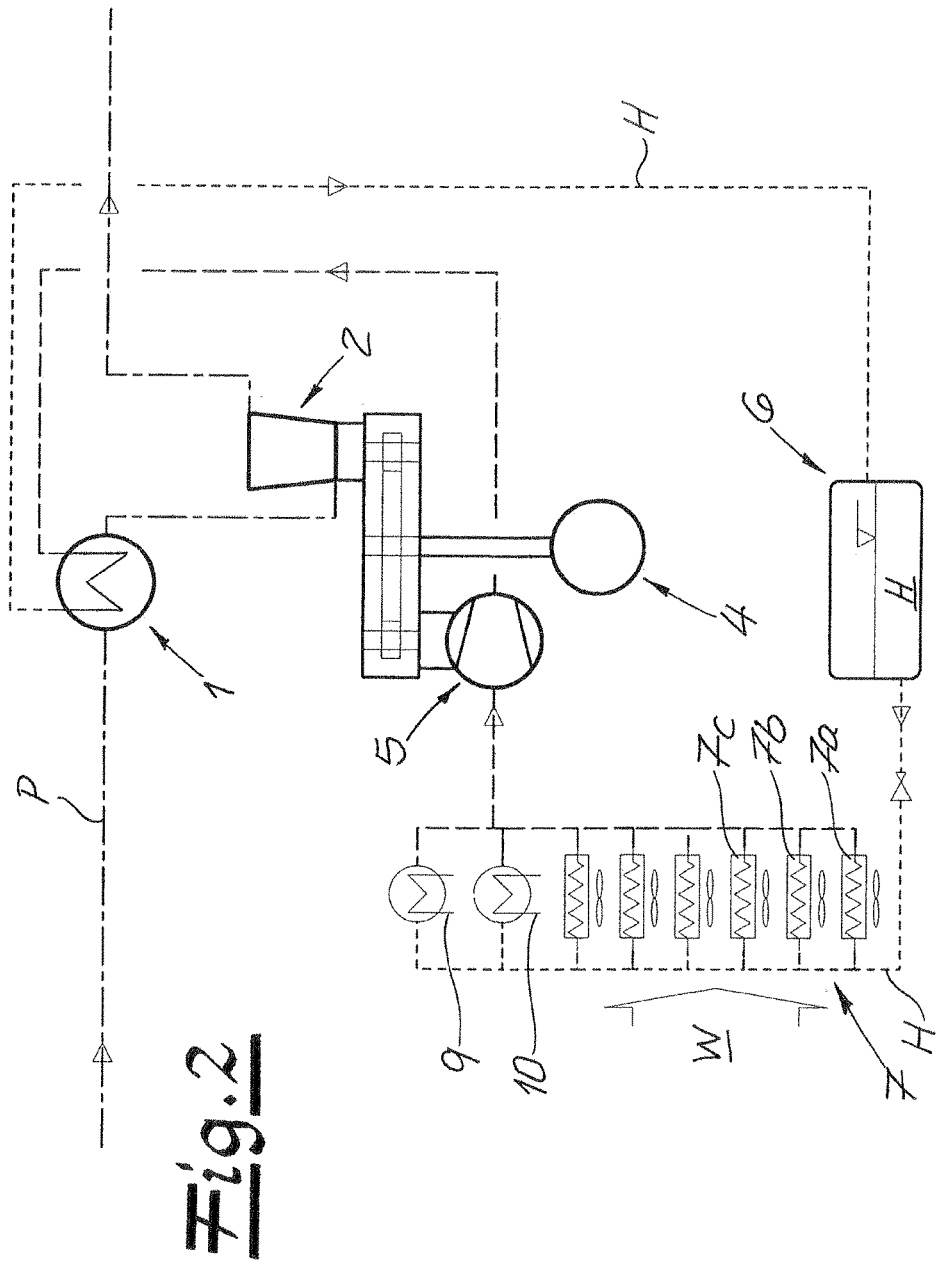
FIG. 2 shows a method according to the invention having a process gas and a hot gas.

FIG. 2 schematically shows a process circuit diagram for the method according to the invention for converting pressure energy into electrical energy in the case of an only one-stage expansion in an expansion turbine 2. The heating of the process gas P takes place by an input heat exchanger 1; since the process has only one stage, an intermediate heat exchanger 3 is not required. In addition, compression of the heating medium H takes place in only one stage of the compressor 5 which is driven by the expansion turbine 2.

The heating medium H is provided, as the second medium, in a heating medium tank 6, wherein the heating medium H is present as a two-phase, liquid/gaseous mixture in this case as well. Proceeding from an at least partially liquid state, the heating medium H is subsequently fed to a vaporization arrangement 7 consisting of multiple individual vaporizers 7a, 7b, 7c, . . . . In this case, the individual vaporizers 7a, 7b, 7c, . . . are connected in parallel to one another. As a particularity with respect to the method presented in FIG. 1, the heat from the generator cooler 9 and the oil cooler 10 are used directly for vaporizing and heating the heating medium H.

After vaporization in the vaporization arrangement 7, the heating medium H is compressed in the compressor 5 and is subsequently fed directly to the input heat exchanger 1. Therefore, no heat is transferred to a transfer medium U which has been selected as the second medium. The heating medium H cools down in the input heat exchanger 1 and at least partially condenses out as the process continues. The heating medium H is fed back to the heating medium tank 6 in this state, and therefore the process can be carried out again.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:
1. A method for energy conversion from pressure energy into electrical energy using an expansion turbine, comprising steps of:
first, heating a pressurized, gaseous, first medium, the pressurized, gaseous first medium comprising natural gas or compressed air;
feeding the heated, pressurized, gaseous, first medium into the expansion turbine;
driving a generator and a compressor by the expansion turbine;
vaporizing a second medium using external energy from geothermal or solar processes or using ambient heat in a heating arrangement for generating heat before compressing the gaseous second medium in the compressor; and second, heating the gaseous first medium using the heat from the heated, gaseous second medium, wherein the first medium is carried in an open process.

2. The method according to claim 1, wherein the heating arrangement has a closed circuit in which the second medium circulates and wherein the second medium proceeds from a heating medium tank and is present in the heating medium tank in an at least partially liquid state.

3. The method according to claim 1, wherein an ambient temperature is determined; wherein the second medium is fed to a heat exchanger; and wherein a vaporization temperature of the second medium is below the ambient temperature in order that the second medium is completely vaporized under the influence of the ambient energy of the ambient temperature.

4. The method according to claim 1, wherein the compressing takes place in two stages.

5. The method according to claim 1, wherein heat from the second medium is transferred in a first heat exchanger to a third medium, and wherein the heat transferred to the third medium is used for heating the gaseous first medium in an input heat exchanger.

6. The method according to claim 5, wherein the third medium circulates in a closed circuit, is driven by a pump and proceeds from a tank.

7. The method according to claim 1, wherein expansion of the gaseous first medium takes place in two stages; and wherein the gaseous first medium is preheated again between the two stages in an intermediate heat exchanger.

8. The method according to claim 1, wherein the pressure energy, ambient heat (W) and, waste heat from any of the steps of first heating, feeding, driving compressing and second heating is exclusively used for the energy conversion from pressure energy into electrical energy.

9. An expansion turbine system, comprising:
a generator;
a compressor;
an expansion turbine that drives both the generator and the compressor via a transmission upon expansion of a first heated medium comprising natural gas or compressed air in the expansion turbine, wherein the first medium is carried in an open process; and
a heating arrangement for heating a second medium by vaporizing the second medium using external energy from geothermal or solar processes or using ambient heat;
wherein the compressor is connected to the transmission and is a component of the heating arrangement for compressing the second medium; and
wherein the heating arrangement further comprises an input heat exchanger in a supply line of the expansion turbine, the input heat exchanger being configured for heating the first medium.

10. A method for energy conversion from pressure energy into electrical energy, wherein a pressurized process gas in the form of natural gas or compressed air is initially preheated and is subsequently expanded and carried away in an open process to release pressure energy that is converted into mechanical energy by an expansion turbine and then into electrical energy by a generator driven by the expansion turbine, and wherein a portion of the mechanical energy is used for operating a thermodynamic cycle, the method including the steps of:
a) vaporizing a partially liquid heating medium via the introduction of external energy from geothermal or solar processes or via ambient heat to a gaseous heating medium;
b) compressing the gaseous heating medium by a compressor driven by the expansion turbine;
c) cooling and condensing the gaseous heating medium via a direct or indirect release of energy to the process gas; and
d) throttling the cooled and condensed gaseous heating medium.

11. The method according to claim 10, wherein the heating medium does not give off heat directly to the process gas; and wherein heat from the heating medium is used for heating a second thermodynamic cycle, the second thermodynamic cycle including the steps of:
a) providing a liquid transfer medium;
b) introducing mechanical work into the transfer medium;
c) cooling the transfer medium by giving off thermal energy to the process gas; and
d) heating the transfer medium via introduction of thermal energy from the heating medium.

* * * * *